Figure 1:
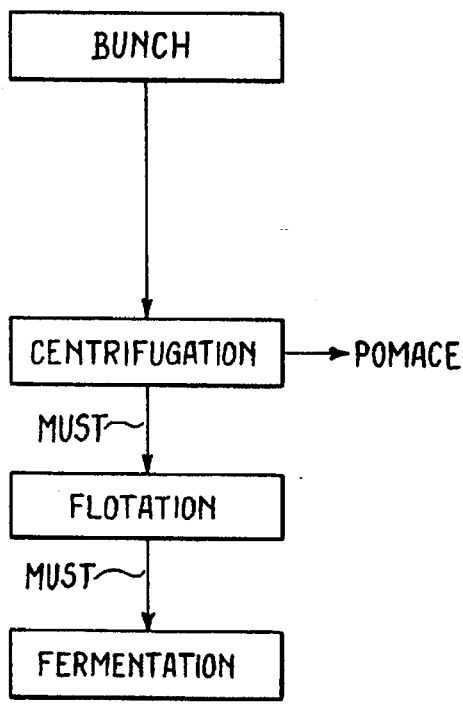

United States Patent
Pieralisi

[11] Patent Number: 5,656,180
[45] Date of Patent: Aug. 12, 1997

[54] PROCESS FOR THE OBTENTION OF MUST FROM BUNCHES OF GRAPES COMPRISING AT LEAST ONE PHASE OF CENTRIFUGATION OF THE BUNCH ITSELF

[75] Inventor: Gennaro Pieralisi, Jesi, Italy

[73] Assignee: Nuova M.A.I.P. Macchine Agricole Industriali Pieralisi S.p.A., Italy

[21] Appl. No.: 372,232

[22] Filed: Jan. 13, 1995

[51] Int. Cl.$^6$ ............................................. B01D 21/26
[52] U.S. Cl. ......................... 210/781; 210/360.1; 494/53; 99/277
[58] Field of Search .................. 99/276, 275, 277.2; 426/489, 236; 100/117; 494/27, 53, 85; 210/781, 360.1, 380.1, 380.3

[56] References Cited

U.S. PATENT DOCUMENTS

| | | | |
|---|---|---|---|
| 2,573,585 | 10/1951 | McBean | 100/50 |
| 2,852,387 | 9/1958 | Pirelli-Minetti | 99/276 |
| 3,959,120 | 5/1976 | Pollock et al. | 99/276 |
| 4,190,194 | 2/1980 | Amero | 494/53 |
| 4,266,473 | 5/1981 | Hunt et al. | 100/117 |
| 4,369,698 | 1/1983 | Hemfort et al. | 99/486 |
| 4,665,807 | 5/1987 | Rieger | 99/277.2 |
| 5,112,627 | 5/1992 | Perletti et al. | 426/236 |

FOREIGN PATENT DOCUMENTS

| | | |
|---|---|---|
| 0444976 | 9/1991 | European Pat. Off. |
| 0326764 | 6/1903 | France |
| 2477383 | 9/1981 | France |
| 0622820 | 4/1981 | Switzerland |

OTHER PUBLICATIONS

PTO 96-3840, translation of Swiss #622,820 Apr. 1981.
PTO 96-3866, transtaltion of FR 326,764 May 1903.
PTO 96-3841, translation of EPA#044976 Apr. 1991.
Van Norstand's Scientific Encyclopedia, Sixth Edition 1983.

*Primary Examiner*—David A. Reifsnyder
*Attorney, Agent, or Firm*—Ladas & Parry

[57] ABSTRACT

A process for the obtention of must from bunches of grapes, comprising at least one phase of centrifugation of the said bunch, capable of bringing about separation of the must from the pomace prior to subjecting the must to fermentation.

4 Claims, 1 Drawing Sheet

PROCESS FOR THE OBTENTION OF MUST FROM BUNCHES OF GRAPES COMPRISING AT LEAST ONE PHASE OF CENTRIFUGATION OF THE BUNCH ITSELF

The object of this invention is a process for the obtention of must from bunches of grapes by pressing brought about by centrifugation of the bunch itself.

It is known that the traditional method of processing grapes in order to obtain the must to be subjected to fermentation comprises phases of: crushing—for the opening, separation and breaking of the grapes; pressing—for the removal of the pomace (that is, the residual solid parts: skins, stems and seeds) and, where necessary, disposal—that is, filtration of the solid residue effected through vacuum filters, plate filters or disc centrifuges.

In greater detail, it is possible to distinguish two principal processes respectively termed
red vinification
white vinification.

The first process, obviously applied to red grapes for the obtention of red wines, comprises the following processing phases:
crushing with or without stemming (removal of stems),
delivery to the fermentation tank via a pump,
fermentation with or without temperature control,
drawing-off, that is, drainage of the fermentation tank leaving in it only the fermented pomace,
extraction of the pomace by means of suitable equipment,
pressing of the pomace using hydraulic, screw or diaphragm presses.

The wine obtained from drawing-off or that obtained from the pomace pressing phases is then placed in suitable tanks to bring about decanting of the solid residue or sediment, including the addition of clarifying agents.

When the sediment settles on the bottom there is performed a second drawing-off operation and the sediment is sent to the distillery after filtering, to obtain the last wine from the sediment.

White vinification, which is reserved for white grapes or for pink grapes used to make rose wine, involves the following phases:
crushing with or without stemming,
subjection to the subsequent pressing phases, which may be of three types:
a) demustering, which is very slight and serves to obtain "pure must", that is, a must of juice alone and without laceration of the skin:
b) soft pressing which serves to obtain a must of optimum quality and with little processing of the skin.
The latter may be carried out in a continuous manner with screw-type presses, and in a discontinuous manner with hydraulic or pneumatic presses.
c) pressing to extract the last part of the must, often of poor quality and containing many lacerated skins.
possible purification of the must, by removing the suspended substances, prior to being sent for fermentation.

This purifying operation may be carried out by gravity with the introduction of adjuvants in the tanks, or by filtration or centrifugation.

Once purified, or even if this operation is not performed, the must is sent to the fermentation vats where it is turned into wine.

After vinification has completed, at the bottom of the tank there settles the fermentation "sediment" which is removed by "drawing-off". The sediment is then processed to extract its residual wine content. This operation is performed using either plate or vacuum filters, or using disc centrifuges or continuous horizontal-axis centrifuges known as decanters.

For each of these phases it is, however, essential to use different machines which need to be linked to one another by conveyor systems for automatic production or, in the case of semi-automatic production, for collecting, transporting and feeding the products and the waste from each process to the next phase or for disposal as appropriate.

Furthermore, the methods of known type for the industrial processing of grapes make it compulsory to use additives and special intermediate treatments to obtain a must of adequate quality. Inter alia there are commonly used techniques known by the name of flotation and consisting of the insufflation of gas into the crushed must tanks in order to bring about the rising of the solid particles still present in the said must, as well as the addition of chemical adjuvants to facilitate such rising of the particles.

There is therefore posed the technical problem of providing a simplified process for the production of must from whole bunches of grapes which will make it possible to reduce to a minimum the intermediate processing phases and the relevant ancillary operations, as well as making it possible to reduce the number of machines necessary for such processing and to avoid the use of chemical adjuvant substances for the processing of the must to be subjected to fermentation, with obvious savings in money, floor space and operating personnel.

Such results are obtained according to this invention by a process for the obtention of must from bunches of grapes, comprising at least one phase of centrifugation of the unpressed bunch with separation of the must from the pomace prior to subjecting the must to fermentation. More particularly, provision is made for the centrifugation phase to be implemented by means of a continuous, horizontal axis scroll-type centrifuge.

Figure 2:
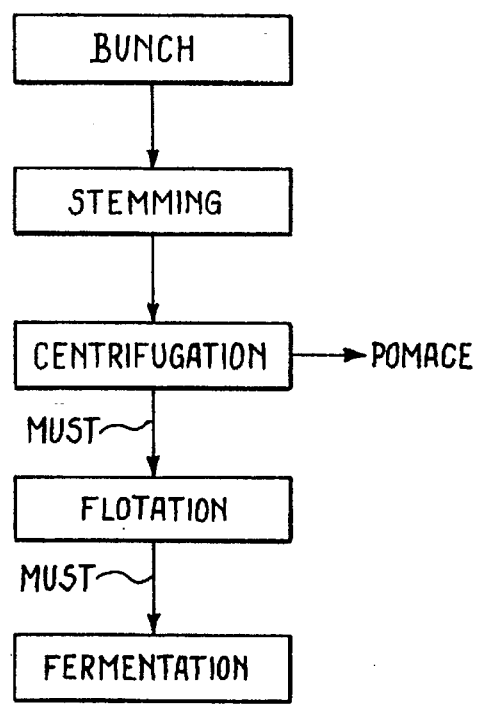
Figure 3:
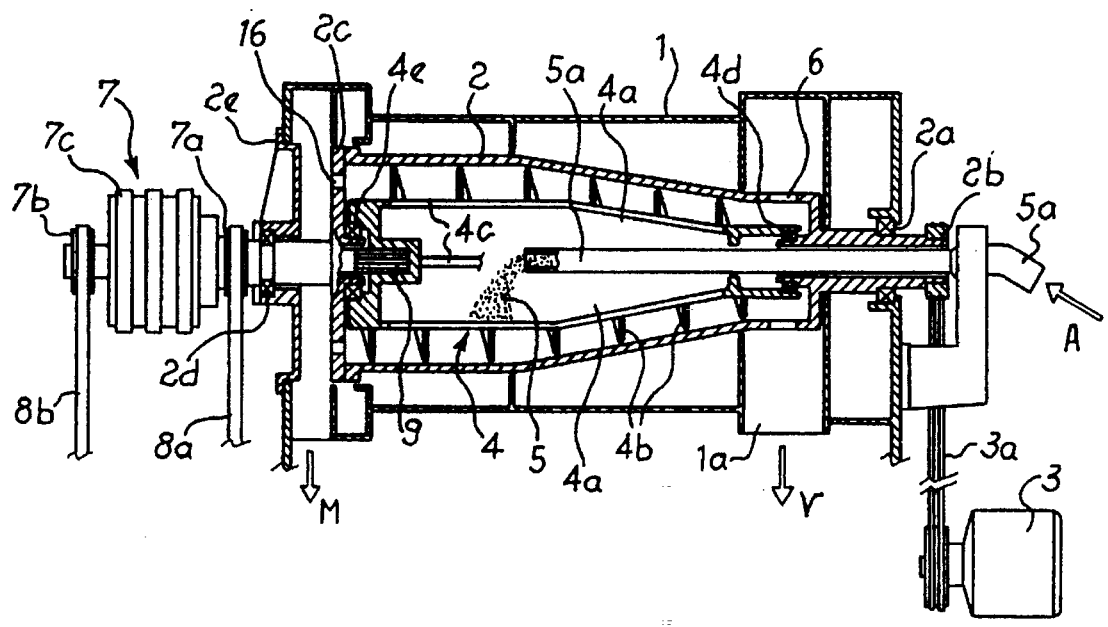

Further details may be obtained from the following description with reference to the attached drawings, which show:

In FIG. 1: a schematic flow diagram of the process according to the invention;

In FIG. 2: a diagram of the process according to the invention with an intermediate stemming phase, and In FIG. 3: a schematic axial cross-section of a decanter centrifuge for the implementation of the process according to the invention.

As shown in FIG. 1, the process according to this invention is essentially comprised of a single centrifugation operation performed on the whole bunch as harvested.

During centrifugation, performed with a machine which will be described later, there is obtained the separation of the must from the pomace. Because centrifugation of the must takes place at a speed of rotation such as to bring about centrifugal forces on the must exceeding 1500 times the force of gravity, during separation of the liquid from the solids inside the continuous horizontal centrifuge there are brought about two significant effects:
a) the high pressure causes a larger quantity of gas extracted from the grape to pass into solution in the must, which is therefore enriched with natural gas and fragrance which enhance its quality,
b) the high surface of free must under pressure which is obtained in the centrifuge is such that a larger quantity of air passes into solution, bringing about advantageous oxidation of all the oxidizable substances which are well known to detract from the quality of the must.

When the must is extracted from the continuous horizontal centrifuge and pumped into the appropriate tanks, there occurs an instantaneous drop of pressure to ambient value so that the must is still oversaturated with natural gas and air, which are released in the form of bubbles which rise to the surface through the must, dragging with them the solid particles still present in the said must.

Furthermore, the sudden drop in pressure also brings about breakage of the solid particles which release the gas contained therein, which gas becomes joined with the rising gas bubbles and facilitates the ascent of the solid particles to the surface.

Under these conditions, flotation takes place within an average time of about 10–30 minutes, typically 15–25 minutes, and is performed without any addition of adjuvant substances, additives and/or the like and/or insufflation of gas.

Such flotation takes place in tanks equipped with paddle assemblies which, on rotating in contact with the free surface of the must, collect the solid residue arriving at the surface and dispose of it. Such devices are self-evident and are not therefore shown in the figures.

The pomace is instead extracted from the centrifuge and subjected to the subsequent operations of discharge and/or further processing for the recovery of second-quality must.

In FIG. 2 is shown a diagram of an alternative method of implementation of the process according to the invention, which is particularly suited to the processing of grapes— such as for example the muscatel grape—which, because of their particular cellular structure, should normally be pressed with the stems in order to achieve a high yield of must within an industrially acceptable period of time.

In this case there is carried out preliminary stemming of the bunch and subsequent centrifugation of the grapes with the stems removed.

As illustrated in FIG. 3, the equipment which makes possible the implementation of the process according to the invention is comprised of a fixed, substantially cylindrical housing 1, equipped approximately at one end with an annular section open at the bottom to form a radial outlet 1a, from which solid product "V" is extracted.

Inside fixed housing 1 and coaxially thereto is located a rotary hollow drum or bowl 2, of substantially cylindrical form with a truncated-cone end, which is mounted at its driving end on bearings 2a to allow rotation with respect to housing 1, while such drum drive is comprised of a pulley 2b operated by belts 3a driven by a motor 3. It can be seen from the drawing that the drum or bowl 2 is imperforate. Inside drum 2 and coaxially thereto is also located a scroll 4 substantially consisting of a body and formed by circumferential sectors 4a made integral with one another in order to form longitudinal slots 4c for the delivery of product 5 fed via a pump, not illustrated, and a duct 5a which enters into the body of the scroll, on the outer surface of which is made integral a helix 4b the purpose of which will be described more clearly hereinafter.

Such scroll is supported at the opposite end by bearings 4d and 4e integral with drum 2, with respect to which scroll 4 may rotate as described hereinafter.

The centrifugal extractor is also provided with drain apertures 16 for the discharge of liquid phases "M".

At the opposite end drum 2 is made integral—via an end-closing disc 2c the hub of which runs in bearings 2d supported by wall 2e—with housing-crownwheel 7c of a gear, for example of epicycloidal type 7, to which it imparts movement with an equal number of revolutions; such movement is then taken up by a pulley 7a via a belt 8a which, as will be more clearly described hereinafter, is in turn fitted to a device for regulating the relative speed between the scroll and drum, not illustrated.

To said gear 7 is also fitted a further belt 8b which, by means of a pulley 7b of gear 7, drives a shaft (not illustrated) acting on the satellites of epicycloidal gear 7, which satellites in turn actuate the secondary shaft of the gear which causes to rotate splined shaft 9 which drives scroll The different number of revolutions of the scroll with respect to the drum is determined by the transmission ratio of gear 7 as well as by the sizes of the two pairs of pulley 7a, 14a and 7b, 14b linked thereto via respective belts 8a, 8b.

The operation of the centrifugal extractor is as follows: the bunch fed via duct 5a (arrow "A") enters into hollow scroll 4 and, on emerging from slots 4c, is stratified by centrifugal action on the outermost peripheral area of drum 2 due to being of higher specific gravity with respect to the liquid phase, or to the two liquid phases, which are stratified on the solids according to their specific gravity.

The liquid must drains out via outlets 16 (arrow "M"), while the solids consisting of the pomace are conveyed to outlet 6 of helix 4b of scroll 4, which has a relative rotary movement with respect to drum 2, the direction of relative rotation being closely linked to the direction of the helical surface and in any event such as to cause the forward movement of the solid product toward outlet 1a (arrow "V").

Many variants may be introduced in the implementation of the invention without departing from the scope of protection of this patent as described in the claims which follow.

I claim:

1. A process for the obtention of must from bunches of grapes comprising at least one phase of centrifugation of the bunches for separating the bunches of grapes into must and pomace prior to subjecting the must to fermentation, wherein said centrifugation is effected with a centrifuge rotating at a speed such as to exert on the must a centrifugal force not lower than 1500 times the force of gravity and wherein the centrifugation phase is implemented by a continuous decanter centrifuge having a scroll and imperforate bowl.

2. A process for the obtention of must from bunches of grapes comprising the following steps:

feeding the bunches to a centrifugation device;

centrifugation of the bunches for separating the bunches of grapes into must and pomace said centrifugation being effected at a rotational speed such as to exert on the must a centrifugal force not lower than 1500 times the force of gravity;

extraction and collection of the pomace;

extraction, collection and subjection of the must to flotation; and subjection of the must to fermentation, wherein the centrifugation phase is implemented by a continuous decanter centrifuge having a scroll and imperforate bowl.

3. A process for the obtention of must from bunches of grapes comprising the following steps:

stemming the bunches of grapes;

feeding the grapes to a centrifuge;

centrifugation for separating into must and pomace said centrifugation being effected at a rotational speed such as to exert on the must a centrifugal force not lower than 1500 times the force of gravity;

extraction and collection of the pomace;

extraction, collection and subjection of the must to flotation; and subjection of the must to fermentation, wherein the centrifugation phase is implemented by a continuous decanter centrifuge having a scroll and imperforate bowl.

4. A process according to claims 1 or 2 or 3 wherein the centrifuge has at least one outlet for the must and one outlet for the pomace.

* * * * *

UNITED STATES PATENT AND TRADEMARK OFFICE
CERTIFICATE OF CORRECTION

PATENT NO. : 5,656,180
DATED : August 12, 1997
INVENTOR(S) : Gennaro PIERALISI

It is certified that error appears in the above—identified patent and that said Letters Patent is hereby corrected as shown below:

Title page, insert Section [30] Foreign Application Priority Data

January 17, 1994 [IT] Italy MI94A 000054

Signed and Sealed this

Eighteenth Day of August, 1998

Attest:

BRUCE LEHMAN

Attesting Officer

Commissioner of Patents and Trademarks